United States Patent [19]
Riis

[11] 3,901,261
[45] Aug. 26, 1975

[54] VALVE FOR MIXING HOT AND COLD WATER

[75] Inventor: Voldemar Riis, Vargarda, Sweden

[73] Assignee: AB Vargarda Armaturfabrik, Vargarda, Sweden

[22] Filed: July 26, 1974

[21] Appl. No.: 492,336

Related U.S. Application Data
[63] Continuation-in-part of Ser. No. 332,136, Feb. 13, 1973, abandoned.

[30] Foreign Application Priority Data
Feb. 24, 1972  Sweden.......................... 2259/72

[52] U.S. Cl................................ 137/100; 137/625.4
[51] Int. Cl.² .......................................... G05D 11/16
[58] Field of Search .............. 137/98, 100, 111, 114

[56] References Cited
UNITED STATES PATENTS

| | | |
|---|---|---|
| 790,584 | 5/1905 | Manning et al....................... 137/98 |
| 2,650,604 | 9/1953 | Barnett............................... 137/111 |
| 2,682,276 | 6/1954 | Fraser................................. 137/100 |
| 2,949,923 | 8/1960 | Clerc................................... 137/98 |

Primary Examiner—Robert G. Nilson
Attorney, Agent, or Firm—Holman & Stern

[57] ABSTRACT

A valve for mixing hot and cold water, particularly for domestic purposes, is provided with two governing members, one for determining the amount of water to be issued, and one for selecting the temperature thereof. The valve is further provided with means for maintaining this temperature in spite of possible changes of the pressure in any of the supply conduits. Even if the temperature of the water supplied is not changed a variation of the pressure will alter the amount of water entering the valve, and thus the selected ratio between the two part streams.

2 Claims, 2 Drawing Figures

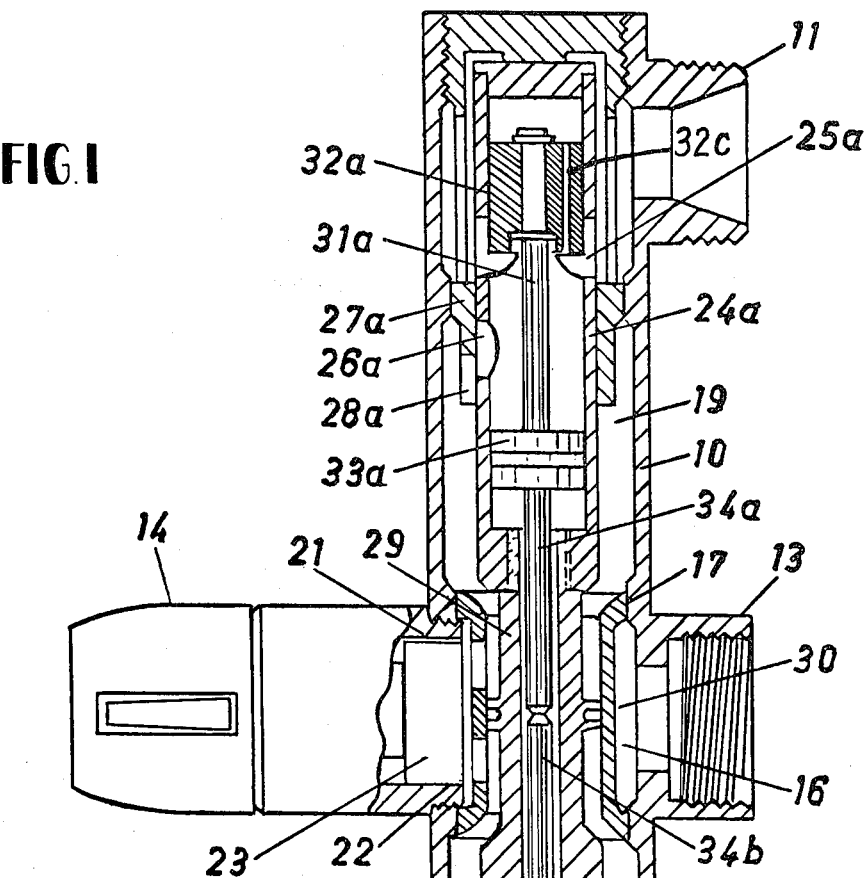
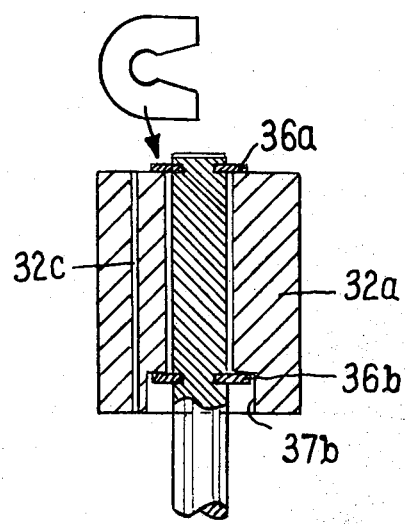
FIG.1
FIG.2

VALVE FOR MIXING HOT AND COLD WATER

RELATED APPLICATION

This application is a continuation-in-part of my co-pending application Serial No. 332,136, field February 13, 1973 now abandoned.

BACKGROUND OF THE INVENTION

The present invention relates to a valve for mixing hot and cold water.

One object of the invention is to provide means to accurately determine the temperature of the water issued from the valve, and to maintain this selected temperature in spite of possible changes in the pressure of the water in any of the supply conduits. A mixing valve of the type suitable for this purpose comprises an elongated housing having a mixing chamber connected to an outlet at its middle portion, and is, at its opposite ends, provided with inlets for connection to conduits supplying hot and cold water, respectively, a first governing member to determine the total volume of water issued from the valve and a second governing member to meter out the part streams admitted from each of the two inlets, and thus the temperature of the mixed streams leaving the valve, with said housing further being provided with means to compensate for changes in the volumes of the streams of water caused by changes of the pressures at any of the supply conduits connected to the valve housing inlets.

SUMMARY OF THE INVENTION

The invention is characterized in that the metering of the part streams within each of the end portions of the housing, separated by the mixing chamber, is obtained by means of a sleeve which is rotatable, but axially non-displaceable with respect to a fixed guide, and is provided with axially spaced inlets and outlets, respectively, of which one cooperates with a profiled passage in the guide, that an axially displaceable spool is mounted within each sleeve and is provided with two lands, which between themselves define a passage from the inlet of the pertaining sleeve to the outlet thereof, one of said lands, depending upon the occasional axial position of the spool, determining the inflow to the sleeve, and that the two sleeves are interconnected to be simultaneously turned by the second governing member while the two spools are designed to act upon each other.

BRIEF DESCRIPTION OF THE DRAWING

One embodiment of a mixing valve according to the invention will be described below with reference to the accompanying drawing, in which:

FIG. 1 is a longitudinal section through the valve, and
FIG. 2 is a fragmentary exploded view.

DESCRIPTION OF THE PREFERRED EMBODIMENT

The mixing valve comprises an elongated housing 10, provided at one end with an inlet 11 for connection to a conduit supplying cold water. At its opposite end, the housing is provided with a further inlet 12 for connection to a conduit supplying hot water, and intermediate the ends is an outlet 13. The total volume of water issued from the valve is determined by means of a first governing member 14, while the temperature of this water is determined by a second governing member 15.

The outlet 13 is connected to an annular mixing chamber 16, which encloses a passage 17 interconnecting two portions 19 and 20 of the housing separated by the mixing chamber. Two openings 21 and 22, respectively, are provided in one side wall of the passage 17 and are adapted to cooperate with a valve member 23, which is displaceable towards and away from the side wall by means of the first governing member 14, and will thus primarily determine the volume of water issued.

The temperature of this water is determined by a metering out of the part streams transferred to the mixing chamber 16 from the two inlets 11 and 12, respectively. The metering out is effected by means of sleeves 24a, 24b, respectively, within each portion 19 and 20, respectively, of the housing. Each sleeve is rotatable, but non-displaceable in the axial direction. The metering devices in the two portions of the housing are identical and the same reference numerals are used to denote corresponding components. Each sleeve is provided with an inlet 25a and 25b, as well as an outlet 26a and 26b, respectively, and cooperates with a fixed guide 27a and 27b, respectively. Each guide is provided with an outlet passage 28a and 28b, respectively.

Each of these guide outlet passages is shaped with a profiled governing edge, and depending upon the angular position of the sleeve with respect to the fixed guide, the outlet 26a, 26b and the outlet passage 28a, 28b will together determine the available outlet area. The two sleeves 24a and 24b are interconnected and are rotated simultaneously, and it is evident that the outlet passages 28a and 28b are designed in such a manner that their governing edges are reversely located, whereby one passage area is opened while the other is closed, and vice versa.

The interconnection of the two sleeves 24a and 24b is effected by means of a tubular member 29, which extends through passage 17 at the mixing chamber, and at its middle portion is provided with an external guide 30, which is located intermediate the openings 21 and 22, and thus separates the cold water portion 19 of the housing from the hot water portion 20 thereof. The guide will, at its opposite ends, permit free entrance from the portions 19 and 20 to passage 17 and thus to the openings 21 and 22.

The desired angular position of the sleeves 24a and 24b is obtained by means of the second governing member 15. A certain quantity of hot water will correspond to a certain quantity of cold water, but the total quantity will be determined by the first governing member 14. A turning of the second governing member 15 will decrease or increase, respectively, the flow of hot water, and will simultaneously increase or decrease the flow of cold water in such a manner that the desired temperature is obtained. This, however, presupposes that the supply to the pertaining inlets remains constant. In large apartment buildings it often happens that the issue from one valve is so great that the pressure in a common supply conduit will be reduced, which will influence the admission of water to the adjacent valves.

A dangerous incident may occur if the pressure in the cold water supply conduit suddenly drops, and the deficient quantity of cold water is substituted by hot water, which could cause scalding. In order to prevent such an undesirable change in the selected temperature, each sleeve is provided with a spool 31a, 31b, respectively, each having two lands 32a, 32b and 33a, 33b, respectively. These are spaced in the axial direction a distance corresponding to, or slightly exceeding the distance between the inlet to and the outlet from each sleeve, respectively. The lands 32a, 32b have through passages 32c and 32d, respectively, and cooperate with the inlet to the pertaining sleeve in such a manner that, depending upon the occasional axial position of the spool, it will determine the available inlet area. It will be seen in FIG. 2 that the lands fit with a clearance about the spools and are mounted on the spools by spring clips 36a and 36b which fit into notches 37a and 37b in the spools. Other mounting means may be employed such as an innermost fixed flange on the spool and a nut for the outermost clip.

When an adjustment is made for obtaining a desired temperature of the water issued, this presupposes a certain pressure at each of the inlets. If, for instance, the pressure of the cold water at the inlet 11 should drop noticeably while the pressure at the hot water inlet 12 remains constant, the spool 31b will be displaced upwards (as shown in the drawing) and will simultaneously bring spool 31a along. This means that the available inlet area to sleeve 24b is decreased, while at the same time the available inlet area to sleeve 24a is increased. Each spool is provided with a rod 34a and 34b, respectively, which extends into the tubular member 29, and has such a length that the two rods will meet inside the tubular member. The two spools will thus, in use, provide a cooperating unit which is displaced forwards and backwards depending upon changes of the pressures in the supply conduits, and which automatically will alter the inflow to the inlets 25a and 25b, respectively, in such a manner that the selected proportions between hot and cold water are maintained.

The tubular member 29 is shown as a unitary piece, but from manufacturing points of view, it may be advantageous to produce such member in two parts. Alternatively, the member may be divided and the portions thereof be integral with the sleeves, with the latter cooperating by way of a splined connection or the like permitting the transfer of an angular movement from the second governing member to the sleeve remotely located with respect thereto.

What is claimed is:
1. In a valve for mixing hot and cold water comprising an elongated housing, said housing having a mixing chamber connected to an outlet at its middle portion separating the housing into end portions, each of said end portions having an inlet for connection to a conduit supplying cold or hot water, respectively, a first governing member for determining the total volume of water issued, and a second governing member for metering out the part streams of water admitted from each of the two inlets and thus the temperature of the mixed streams leaving the valve outlet, said housing further being provided with means for compensating changes in the streams of water caused by changes of the pressures in any of the supply conduits connected to the valve housing inlets, the improvement of a central passage extending through the mixing chamber and defined therefrom by at least one side wall, said passage in said at least one side wall having two openings for cooperation with a valve member operated by the first governing member, a fixed, tubular guide within each of the end portions, each guide having a profiled outlet opening, a rotatable, but axially non-displaceable sleeve within each of said guides, each sleeve having an inlet and outlet axially spaced therefrom and mating with the outlet opening of the pertaining sleeve, an axially displaceable spool within each of said sleeves, each spool having two lands, between themselves defining a passage from the inlet of the pertaining sleeve to the outlet thereof, one of said lands cooperating with said inlet for determining the entrance area to the sleeve, means for interconnecting the two sleeves for imparting a simultaneous angular movement thereto by the second governing member, and further means for transferring axial movement of one spool to the other spool, said further means extending through said passage and being provided with a guide separating the two openings in the passage wall.

2. The mixing valve as claimed in claim 1 in which the connecting member is of tubular shape and provides a guide for the spools, each spool having an axially extending rod, with said rods meeting within the guide.

* * * * *